(12) United States Patent
Brand et al.

(10) Patent No.: US 8,942,141 B2
(45) Date of Patent: *Jan. 27, 2015

(54) MULTI-CHANNEL MULTI-ACCESS VOICE OVER IP INTERCOMMUNICATION SYSTEMS AND METHODS

(71) Applicant: IntraCom Systems, LLC, Northridge, CA (US)

(72) Inventors: Stephen Brand, Beverly Hills, CA (US); John Jurrius, Oakland, CA (US); David Brand, Northridge, CA (US)

(73) Assignee: IntraCom Systems, LLC, Northridge, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/154,977

(22) Filed: Jan. 14, 2014

(65) Prior Publication Data
US 2014/0126414 A1 May 8, 2014

Related U.S. Application Data

(63) Continuation of application No. 11/970,871, filed on Jan. 8, 2008, now Pat. No. 8,660,039.

(60) Provisional application No. 60/879,101, filed on Jan. 8, 2007.

(51) Int. Cl.
| | |
|---|---|
| *H04L 12/66* | (2006.01) |
| *H04L 12/26* | (2006.01) |
| *H04L 12/16* | (2006.01) |
| *G06F 15/16* | (2006.01) |
| *H04M 3/42* | (2006.01) |
| *H04L 12/18* | (2006.01) |
| *H04L 29/06* | (2006.01) |
| *H04M 3/56* | (2006.01) |

(52) U.S. Cl.
CPC ............ *H04L 12/18* (2013.01); *H04L 65/1053* (2013.01); *H04M 3/42314* (2013.01); *H04L 12/189* (2013.01); *H04L 43/10* (2013.01); *H04M 3/56* (2013.01)
USPC ........... 370/260; 370/252; 370/352; 370/353; 370/354; 370/355; 370/356; 709/204; 709/205; 709/206; 709/207; 379/202.01; 379/203.01; 379/204.01; 379/205.01; 379/206.01

(58) Field of Classification Search
CPC ....... H04L 12/18; H04L 12/189; H04L 43/10; H04L 65/1053; H04M 3/56; H04M 3/42314
USPC ................. 370/252, 260, 352–356; 379/202.01–206.01; 709/204–207

See application file for complete search history.

(56) References Cited

U.S. PATENT DOCUMENTS

| | | | |
|---|---|---|---|
| 6,501,739 B1 | 12/2002 | Cohen | |
| 6,850,496 B1 | 2/2005 | Knappe et al. | |
| 7,092,382 B2 | 8/2006 | Lucioni | |
| 7,328,239 B1 | 2/2008 | Berberian et al. | |
| 7,548,875 B2 | 6/2009 | Mikkelsen et al. | |
| 7,672,294 B2 * | 3/2010 | Wengrovitz et al. | 370/352 |

(Continued)

*Primary Examiner* — Asad Nawaz
*Assistant Examiner* — Kai Chang
(74) *Attorney, Agent, or Firm* — Casimir Jones SC

(57) ABSTRACT

The present invention provides systems and methods employing Voice over Internet Protocol (VoIP) technology to provide multi-channel, multi-access voice communication capabilities.

14 Claims, 5 Drawing Sheets

(56) References Cited

U.S. PATENT DOCUMENTS

| | | |
|---|---|---|
| 7,701,882 B2 | 4/2010 | Jones et al. |
| 7,729,247 B2 | 6/2010 | Kim |
| 7,848,265 B2 | 12/2010 | Levy et al. |
| 8,116,236 B2 | 2/2012 | Baird et al. |
| 2004/0006595 A1 | 1/2004 | Yeh et al. |
| 2004/0114607 A1 | 6/2004 | Shay |
| 2005/0064874 A1 | 3/2005 | Beacken |
| 2005/0271194 A1 | 12/2005 | Woods |
| 2007/0058608 A1 | 3/2007 | Lin |
| 2007/0076860 A1 | 4/2007 | Lin |
| 2007/0086436 A1 | 4/2007 | Denny |
| 2007/0086446 A1 | 4/2007 | Denny |
| 2007/0091831 A1 | 4/2007 | Croy |
| 2007/0094409 A1 | 4/2007 | Crockett |
| 2007/0165611 A1 | 7/2007 | Yang |
| 2007/0189262 A1 | 8/2007 | Kim |
| 2007/0201431 A1 | 8/2007 | Juang |
| 2007/0201446 A1 | 8/2007 | Wright |
| 2007/0206567 A1 | 9/2007 | Elias |
| 2007/0242626 A1 | 10/2007 | Altberg |
| 2007/0242658 A1 | 10/2007 | Rae |
| 2007/0248077 A1 | 10/2007 | Mahle |
| 2007/0250702 A1 | 10/2007 | Kirchhoff |
| 2007/0268841 A1 | 11/2007 | Dube |
| 2007/0275702 A1 | 11/2007 | Hwang |
| 2007/0280189 A1 | 12/2007 | Han |
| 2007/0280252 A1 | 12/2007 | Chuang |
| 2007/0286174 A1 | 12/2007 | Brannan |
| 2007/0291907 A1 | 12/2007 | Corcoran |
| 2009/0247120 A1* | 10/2009 | Heutschi et al. .............. 455/406 |
| 2009/0310591 A1* | 12/2009 | Feher ........................... 370/347 |

* cited by examiner

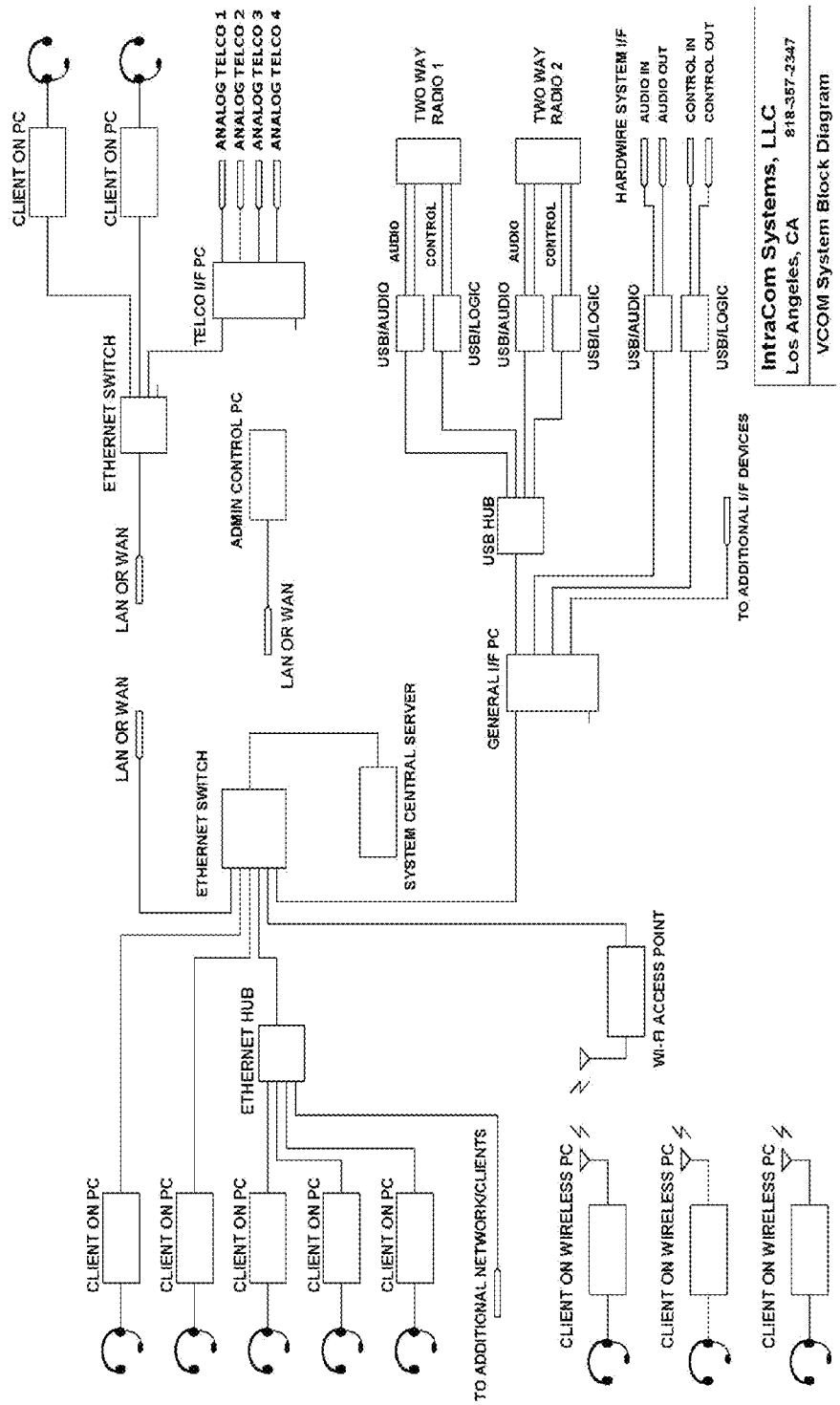
Fig. 1: System Architecture

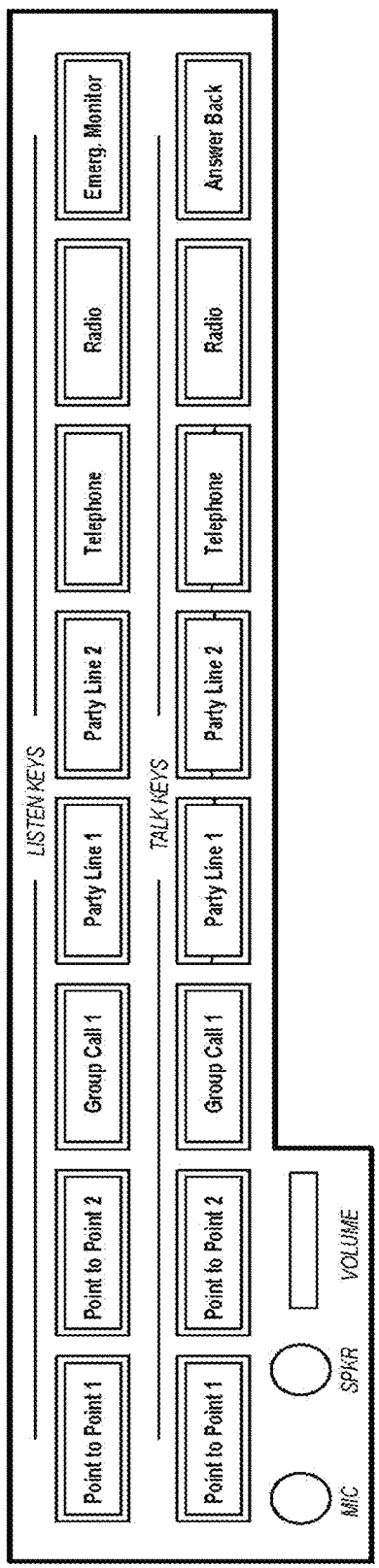
Fig. 2: Operator Control Console

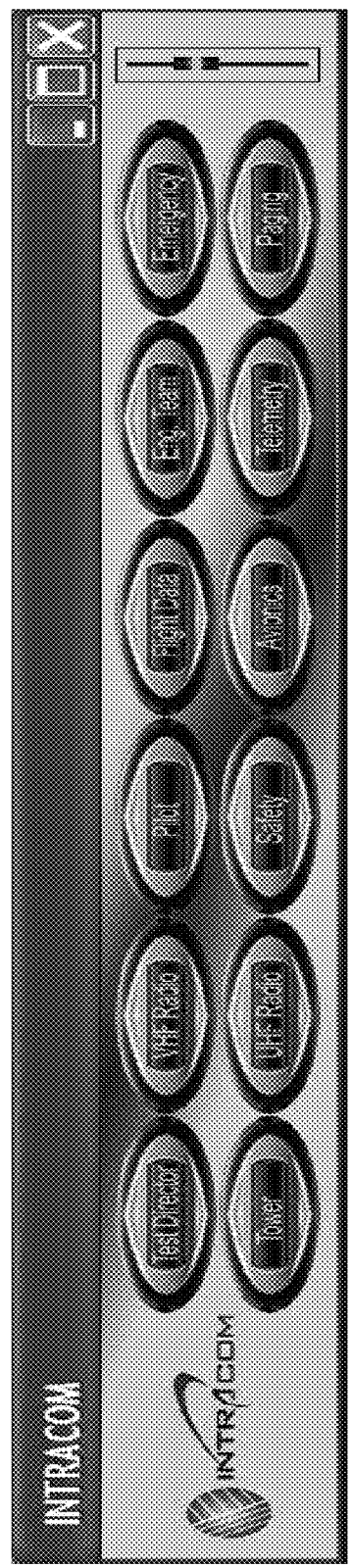
Fig. 3: Control Panel user interface

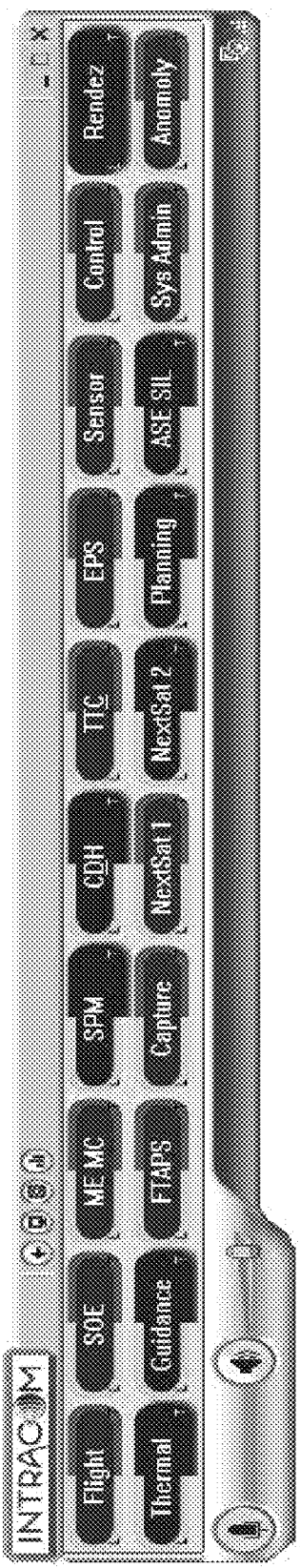
Fig. 4: Control Panel user interface

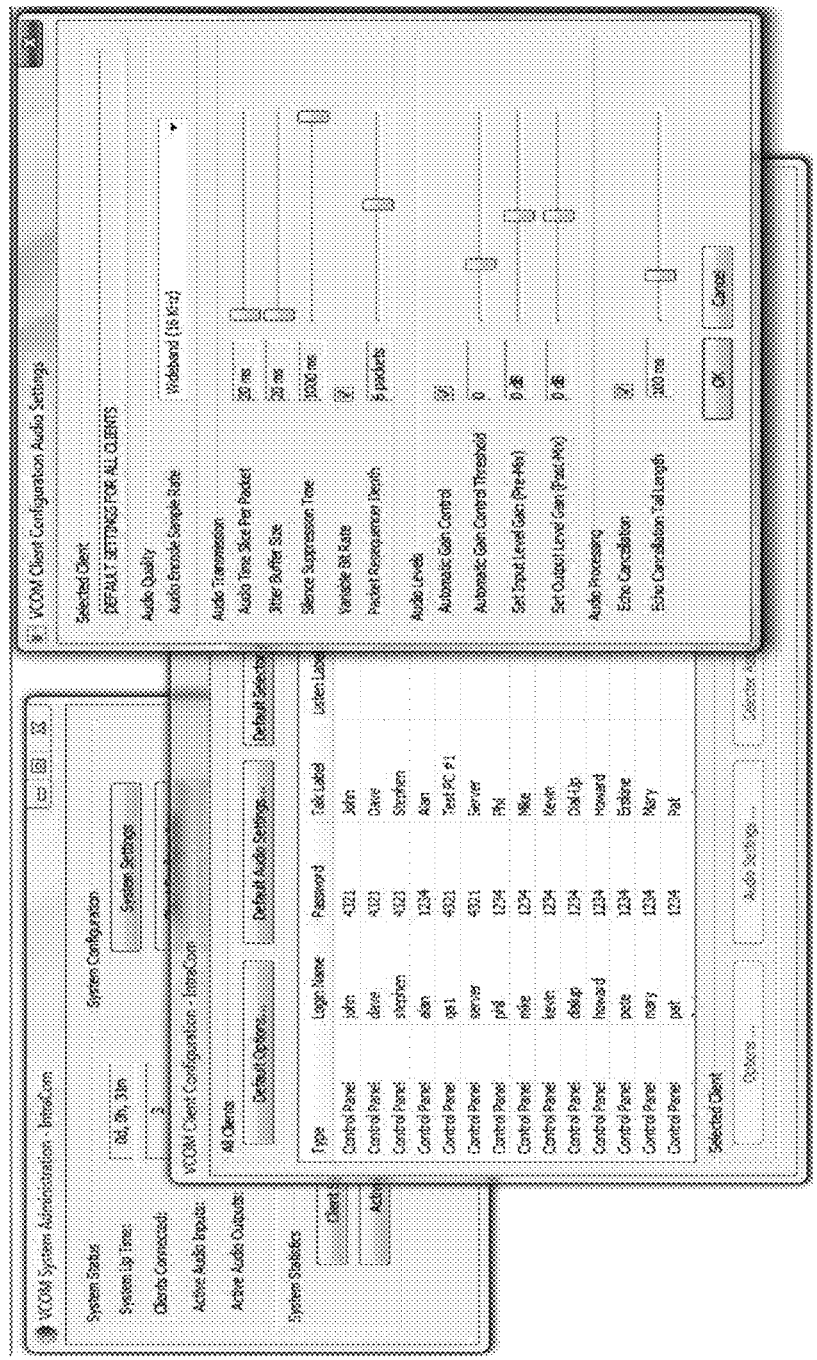
Fig. 5: System Administration user interface implementation

MULTI-CHANNEL MULTI-ACCESS VOICE OVER IP INTERCOMMUNICATION SYSTEMS AND METHODS

The present application is a continuation of U.S. patent application Ser. No. 11/790,871, filed Jan. 8, 2008, which claims priority to U.S. Provisional Patent Application Ser. No. 60/879,101, filed Jan. 8, 2007, each of which is hereby incorporated by reference in their entireties.

FIELD OF THE INVENTION

The present invention provides systems and methods employing Voice over Internet Protocol (VoIP) techniques to provide professional full summing and non-blocking, multi-channel, multi-access voice communication capabilities.

BACKGROUND

Existing professional intercommunication systems employ proprietary hardware and are interconnected via dedicated cabling which constrain the systems to deployment in the same physical area. Such systems are produced in relatively small quantities with costs up to several hundred thousand dollars. These systems are also limited in scale to approximately 1000 subscribers. Some can be interlinked to increase scale, although the process can be expensive. For these reasons, even in traditional markets, use of professional intercommunication systems is limited. What are needed are systems and methods that provide greater flexibility, ease-of-use, and cost. The present invention achieves these goals by utilizing readily available hardware, eliminating all physical deployment constraints, removing system scalability issues and reducing cost.

SUMMARY OF THE INVENTION

Telecommunications techniques have been limited to carrying communication signals over traditional communications networks, like the Public Switched Telephone Network (PSTN). Recently, however, telecommunications techniques have expanded beyond the PSTN to more sophisticated communication networks, like the Internet. As a result of Internet telephony, different techniques have been devised to use IP networks for voice communications. These techniques are collectively referred to as Voice over Internet Protocol (VoIP). VoIP is a term used in Internet telephony for a set of facilities for managing the delivery of voice information using the Internet Protocol (IP). In general, this constitutes communicating voice band information, such as speech, in purely digital form in discrete packets rather than in the traditional analog/digital circuit-switched protocols of the PSTN. A wide variety of systems exist for using, controlling, establishing, testing, and managing VoIP systems (see e.g., U.S. Pat. Publ. Nos. 20070291907, 20070286174, 20070280252, 20070280189, 20070275702, 20070268841, 20070250702, 20072048077, 20070242658, 20070242626, 20070206567, 20070201446, 20070201431, 20070189262, 20070165611, 20070094409, 20070091831, 20070086446, 20070086436, 20070076860, and 20070058608, each of which is herein incorporated by reference in its entirety).

The present invention provides systems and methods employing Voice over Internet Protocol (VoIP) techniques to provide full summing and non-blocking, multi-channel, multi-access voice communication capabilities. In some embodiments, the present invention provides a pure software-based professional intercommunication system over IP. Embodiments of the systems and methods of the present invention eliminate the logistical set-up and scalability constraints and reduce systems cost, especially in large implementations, which not only increase demand in traditional markets but open new ones. Embodiments of the systems and methods of the present invention serve as a next generation replacement to two-way radios.

Embodiments of the systems and methods of the present invention network orientation enable monitoring of channels, enhanced security, control of communications flow among different resources, and interoperability, thus, uniting disparate communications systems.

For example, in some embodiments, the present invention provides a system configured to provide a multi-channel, multi-access communication system. In some embodiments, the present invention provides a system comprising a processor and software, where the software is configured to: a) provide voice over Internet protocol technology; b) receive audio information (and/or other multimedia information) from a plurality of audio sources (e.g., clients such as operators or listeners using any of a number of different communication devices via any number of channels); c) send audio information (and/or other multimedia information) to a plurality of communication devices (e.g., computers, hand-held devices, telephones, radios, headphones, etc.) using said voice over Internet protocol technology; and d) provide control information to one or more user interfaces that permit a client using said user interface to manage said audio information (and/or other information). Any number of computer systems or other devices in one or more locations may be used to implement the system. In some embodiments, a server is provided by a service provider that communicates with a plurality of distant devices used by the client. In some embodiments, the client possesses software that generates the user interface. In some embodiments, the user interface is provided by the service provider to the client over a communication network.

For example, in some embodiments, the present invention provides a client/server software based system comprising a plurality of processors and software components, the server software configured to carry out one or more or all of: utilize Voice over Internet Protocol (VoIP) techniques for audio distribution; receive audio information from a plurality of audio sources using said VoIP techniques; send audio information to a plurality of communication devices using said VoIP techniques; provide control information to a control panel interface (e.g., a Control Panel presented on a display screen of an electronic device) that permits a client using the control panel interface to manage the audio information; provide control information to a system administration interface (e.g., System Administration provided by administration software) that permits a client using the system administration interface to configure one or more or all of the features of the system; and provide control information to a device interface that permits a client using the device interface to interface the system to external audio systems (e.g., those associated with the plurality of audio sources).

While the present invention is not so limited, in some embodiments, the clients and server deploy on standard, off-the-shelf, personal computer based hardware using existing network infrastructure within either a private local area network or over the public Internet with no geographic constraints.

In some embodiments, the system is a non-blocking system that provides full audio summing. In some embodiments, the they system permits one or more of: all clients to communicate with any or all other clients in any combination without restriction; and audio initiated and directed from one client to another to be delivered and heard by the other client without any action required on the part of the receiving client.

In some embodiments, the VoIP techniques utilized allow one or more of: specification of system and client audio bandwidth (e.g., 8 KHz, 16 KHZ or 32 KHz) to allow user control of audio quality and network bandwidth requirements; and specification of the audio time slice per packet to reduce network bandwidth in favor of increased latency, which permits operation over limited bandwidth channels such as a low-speed dial-up connection.

In some embodiments, where a Control Panel is used, the control panel provides one or more or all of: a plurality of clickable keys to provide on/off control of communication channels with configurable controls for activating talk only, listen only or talk and listen; activation of point-to-point private channel communication between operators; activation of a group call between one or more operators acting as callers and a larger number of listeners; activation of a party line for a group conference between a plurality of callers and listeners; an indication of the log on status of a plurality of operators or listeners; an indication of the active communication status of a channel; and a plurality of different clickable key arrangement options provided to each different operators.

In some embodiments, where the System Administration component is used, the system administration interface provides one or both of: the ability to remotely configure one or more or all parameters of the system; and the ability to remotely monitor the status of one or more or all client connections. In some embodiments, the ability to remotely monitor the status of all client connections includes the ability to monitor audio data rates and packet loss statistics.

In some embodiments, where a device interface is used, the device interface provides one or more or all of: ability to connect a plurality of external audio devices to the system with no user action required; ability to interface standard analog POT (plain old telephone) lines through the use of an off-the-shelf telephone interface device; and ability to sense external logic inputs and activate external logic outputs using off-the shelf, general purpose input/output hardware for purposes such as keying the transmitter keying traditional two-way radios.

In some embodiments, the system supports one or more features that are available in professional hardware based intercom solutions, including, but not limited to, Channel Isolation (ISO), the ability to create a private two-way point-to-point conversation between clients; Channel Interrupt Fold Back, (IFB), the ability to temporarily interrupt or dim an audio source monitored by a client when another client activates a talk that to that client; and client adjustable audio level control for each selectable communication channel with differentiated handling of audio levels for individual clients and groups.

In some embodiments, the system uses the VoIP technology, wherein when used with mobile PDAs, SmartPhones, and other off-the-shelf handheld devices connected over WiFi and Cellular data connections, the system provides enhanced replacement functionality for traditional Two-Way Radios.

In some embodiments, the system uses the VoIP technology, wherein when deployed on mini-PCs with a sound card connected to standard analog 4-wire phone, the system provides enhanced replacement functionality of the traditional hard-wired analog 4-wire conference bridge.

The system may be configured to carry out a wide variety of communication applications. In some embodiments, the system is configured to carry out the features provided by traditional hardware-based professional intercommunication systems. In some embodiments, the system provides a software-based user interface that embodies the control features provided to an operator in a traditional hardware-based professional intercommunication system. For example, in some embodiments, the systems of the present invention provide a user interface that permits management of one or more of: point-to-point private channel communication between operators; a group call between one or more operators acting as callers and a larger number of listeners; and a party line for a group conference between a plurality of callers and listeners. In some embodiments, the user interface is user friendly and simulates a hardware-based user interface. For example, in some embodiments, a display provides clickable buttons/keys that activate or deactivate features of the system. Any number of features may be provided on the user interface, including, but not limited to, indications of the log on status of the clients (e.g., operators and/or listeners), indications of the active communication status of a channel (e.g., a particular client is "talking" or not "talking"), and on/off control of the various communications channels. The user interface may further provide any of the traditional control panel features to manage audio such as volume controls, equalization, audio level meters, noise reduction, sound processing, speaker control, and the like. Depending on the application, two or more different types of user interfaces may be provided so that each operator has customized controls tailored to their particular needs. In some embodiments, a System Administration Application is provided to manage information and components of the system. In some embodiments, the System Administration Application is provided to a plurality of users of the system. For example, in some embodiments, the System Administration Application is made available to each of the workstations to permit the user of the workstation to dynamically configure the system. In some embodiments, a subset of users are provided security access to control one or more features of the systems while other users are not given access.

The system may be implemented to work with any number of types of multimedia information sources. For example, the system may be used with information sources including, but not limited to, wired audio devices (e.g., personal computers linked via Ethernet), wireless audio devices, telephones, two-way radio, and the like. In some embodiments, the system is configured to permit connection to hardware-based communication systems.

The present invention further provides methods for communication using any of the systems described herein.

The present invention provides methods for full summing and non-blocking, multi-channel, multi-access communication that use software-based systems employing Voice over Internet Protocol technology and control systems to manage communication between a plurality of clients. The methods may carry out the tasks of any traditional hardware-based professional intercommunication systems.

As used herein the terms "processor" and "central processing unit" or "CPU" are used interchangeably and refer to a device that is able to read a program from a computer memory (e.g., ROM or other computer memory) and perform a set of steps according to the program.

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape and servers for streaming media over networks.

As used herein the terms "multimedia information" and "media information" are used interchangeably to refer to information (e.g., digitized and analog information) encoding or representing audio, video, and/or text. Multimedia information may further carry information not corresponding to audio or video. Multimedia information may be transmitted from one location or device to a second location or device by methods including, but not limited to, electrical, optical, and satellite transmission, and the like.

As used herein the term "audio information" refers to information (e.g., digitized and analog information) encoding or representing audio. For example, audio information may comprise encoded spoken language with or without additional audio. Audio information includes, but is not limited to, audio captured by a microphone and synthesized audio (e.g., computer generated digital audio).

As used herein the term "video information" refers to information (e.g., digitized and analog information) encoding or representing video. Video information includes, but is not limited to video captured by a video camera, images captured by a camera, and synthetic video (e.g., computer generated digital video).

As used herein the term "text information" refers to information (e.g., analog or digital information) encoding or representing written language or other material capable of being represented in text format (e.g., corresponding to spoken audio).

As used herein the term "configured to receive multimedia information" refers to a device that is capable of receiving multimedia information. Such devices contain one or more components that can receive signal carrying multimedia information.

As used herein the term "encode" refers to the process of converting one type of information or signal into a different type of information or signal to, for example, facilitate the transmission and/or interpretability of the information or signal. For example, audio sound waves can be converted into (i.e., encoded into) electrical or digital information.

As used herein the term "in electronic communication" refers to electrical devices (e.g., computers, processors, conference bridges, communications equipment) that are configured to communicate with one another through direct or indirect signaling. For example, a conference bridge that is connected to a processor through a cable or wire, such that information can pass between the conference bridge and the processor, are in electronic communication with one another. Likewise, a computer configured to transmit (e.g., through cables, wires, infrared signals, telephone lines, etc) information to another computer or device, is in electronic communication with the other computer or device.

As used herein the term "transmitting" refers to the movement of information (e.g., data) from one location to another (e.g., from one device to another) using any suitable means.

DESCRIPTION OF THE DRAWINGS

FIG. 1 shows an exemplary network architecture of an embodiment of a system of the present invention.

FIG. 2 shows an exemplary user interface in an embodiment of a system of the present invention.

FIG. 3 shows an exemplary user interface in an embodiment of a system of the present invention.

FIG. 4 shows an exemplary user interface in an embodiment of a system of the present invention.

FIG. 5 shows an exemplary administrator control in an embodiment of a system of the present invention.

DETAILED DESCRIPTION OF THE INVENTION

The present invention provides systems and methods employing Voice over Internet Protocol (VoIP) techniques to provide full summing and non-blocking multi-channel, multi-access voice communication capabilities.

For example, in some embodiments, the present invention provides a software based Intercom over Internet Protocol (IoIP) for full summing and non-blocking multi-channel/multi-access professional intercommunications.

Embodiments of the present invention operate as a specialized general communications system that runs on standard computer and network hardware and is based on a dedicated server, multiple client architecture. FIG. 1 provides a schematic of an embodiment of this architecture. In this example, the server side emulates the functionality of the hardware based digital matrix used for decades in live performance, broadcast, civil, and defense markets, where highly dynamic, fast, and complex communications requirements are essential. The summing aspect of the server side emulates the functionality of a conference bridge used over a public or private switched telephone network. The system's client side control console emulates the functionality of a professional intercommunications control console. Additionally, embodiments of the present invention bridges disparate intercom and voice communications systems including use with hardware based professional communications control consoles, two-way radios, the public switched network, private phone systems, and VoIP solutions.

Individual control consoles used on dedicated PC's or wireless handheld devices provide basic point-and-click control for establishing talk and/or listen voice paths. Multiple group and individual voice paths can be established simultaneously and multiple conferences can be accommodated in any complexity. Subscribers may talk and/or listen in a single conference or multiple conferences, in any combination and in any sequence. All basic paths are set up in advance and are "always on," for instant (multiple) channel access for talking and monitoring. "Dialing" as in a normal telephone system is available to allow seamless interoperability with the public (or a private) switched telephone network.

The following is a non-comprehensive list of features and benefits employed in various embodiments of the present invention:
  Full summing and non-blocking multi channel/multi access professional communications functionality
  Operation may be used in any combination of channel type:
    Point to Point (private channel between any two operators)
    Group Call (one caller to many listeners), and
    Party Line (group conference)
  Key names and configuration—Talk, Listen, or Talk/Listen—programmable from administrator access program
  Dynamic color codes or other indicators that indicate channel status→e.g., offline (gray), online (green and/or red), actuated (bright green and/or red), channel activity (color oscillates), incoming call (color blinks)
  Dynamic "answer back" key for incoming calls from clients for whom a dedicated key is not programmed Client control panels may be oriented horizontally or vertically or other desired configuration and are intended to operate while other programs are running on the same computer Control panel may be interrogated to indicate who is listening "Follow me" function may be set up to automatically find and transfer a call to a person who is away from their base Second audio output enables monitoring from work station speakers System is ready to interface with two way radio, hardware based communications systems, or public/private telephone networks via standard hardware interfaces Scales to many channels (e.g., greater than 10, . . . 12, . . . 20, . . . 30, . . . 40, . . . 50, . . . 75, . . . 100, etc.)

Supports clients over the public Internet as well as dedicated, secure, private networks Digital audio quality Optimized network bandwidth architecture allows use over 56 k modem Traverses firewalls without configuration The description provides a detailed overview of the function in one implementation of the present invention. This implementation is shown, in part, in FIG. 2, showing an exemplary operator control console.

In this implementation, the operator has the client side control panel in front of him with a plurality of color coded keys. There are three primary types of channel configurations, designated by the keys, which may or may not be present in any certain number: 1) Point to Point for a private channel between two operators, 2) Group Call for a channel between one or more operators acting as callers to typically a larger number of listeners and, 3) Party Line for a group conference.

The following is written from the perspective of a given operator. Control Panel keys are activated by clicking on them. A gray key signifies an offline Point to Point or Group Call channel which means the operator on the other end is offline. Green keys are Listen keys. A dark green key signifies an online Point to Point or Group Call channel meaning the operator(s) on the other end of the channel are logged into the system. If the key name is oscillating someone is currently talking on the channel. Party Lines always appear online. The given operator can only listen on a channel when activated, changing the dark green key to bright green. Red keys are Talk keys. A dark red key signifies an operator on the other end of the channel is logged into the system. The given operator can only talk on a channel when activated, changing the dark red key to bright red. A green/red key signifies a combined talk/listen key. A blinking dark red key on a Point to Point channel signifies that the operator on the other end is calling the given operator; the given operator must click on the key to establish a return voice path. Point to Point typically have talk only keys for all operators and Party Lines typically have talk and listen keys for all operators. Group Call channels typically have talk and listen keys for operators assigned to talk and only listen keys for others.

The system is programmable such that each operator may have different keys. Any operator may listen and/or talk to no channels or as many channels as are available on his control panel, simultaneously. If an operator wants to establish a direct voice path with another operator and a Point to Point is not set up on the other operator's station he can do so by using his Answer Back button on the control panel. The operator right clicks on the Answer Back button, selects the operator he desires to call (a list of all users logged on to the system at that point in time will be displayed), and then activates the button. The Answer Back button on the control panel of the operator being called will flash and indicate the name of who is calling him. The called operator clicks on the Answer Back button and establishes a return voice path. The Answer Back key will time out after a pre-set interval if there is no response. In this case a right click on the key will open a list of who called and if more than one incoming call has arrived with no response, the list will show all calls that were not responded to. This list may be cleared when desired. If dialog is to continue it is common for the operators to move discussion to a Party Line to keep the Answer back channel open for other callers.

The system administrator has flexibility in naming control panel keys for each operator. A Point to Point may show an individual's name or function, such as "Dave," "Director," or "Plant Mgr." A Group Call channel may be named descriptively such as "Emergency" or "Security." Similarly, a Party Line may be named "Conference."

The system interfaces with two-way radios, hardware based communications systems, and public/private telephone networks. These channels are typically designated to reflect such and may be talk only (such as paging) or talk/listen. They can be set up as Point to Point, Group Call, or Party Line depending on functional requirements. For use with a two-way radio clicking on the talk key initiates the transmit function. For call out to a public/private telephone network an operator right clicks the Talk key corresponding to the telephone interface which brings up a dial pad to establish a voice path.

The following section describes non-limiting examples of applied uses of the systems and methods of the present invention.

Testing and Simulation

A test aircraft is being flown in the area of a test base and all the systems on the aircraft are undergoing tests. The test team is located in a ground station and is interconnected to the base-wide communications and support infrastructure. Constant and critical communications must be maintained among individual groups in their respective disciplines as well as with an overall test director, control tower, range safety officer/team, and emergency personnel such as fire and medical services. In addition the test could span an area that includes additional ground stations at distant locations. The test success and the safety of ground personal and the public require highly dynamic, fast, and complex communications. FIGS. 3 and 4 show exemplary control consoles.

| Key: Aircraft Testing Virtual Control Panel | |
|---|---|
| TST DIRECTOR - Test Director | TOWER - Control tower |
| VHF RADIO - Very High Frequency radio channel | UHF RADIO - Ultra High Frequency radio channel |
| PILOT - Aircraft Pilot radio channel | SAFTY - Range Safety Officer and team |
| FLT DATA - Group monitoring flight data | AVIONICS - Team monitoring avionics systems |
| ENG TEAM - Team monitoring general engineering | TELEMETRY - Team monitoring telemetry data sig. |
| EMERGENCY - Emergency channel for test base | PAGING - Hanger and shop area paging |

Port Security

A port is being monitored by security officials and there are several people constantly watching port activity and ship movements at sea. Instant communications is necessary between central control room personnel and others located at key vantage points and in mobile vehicles. In addition, interface to Coast Guard, local police, local fire department, and weather service liaison officials is provided. Instant and reliable communications ability is critical to insure homeland security and public safety. No time will be wasted while operators hunt for telephone numbers and try to handle multiple communications devices typically used for individual tasks. The ability to bring together all communications needs in one universal easily changeable system greatly simplifies operations and eliminates the need for time consuming training and re-training as systems are updated over time. Adding additional stations is as simple as adding a computer and the system may be fully and seamlessly accessed from anywhere.

| Key: Port security Virtual Control Panel | |
| --- | --- |
| CST GRD - Coast Guard Command Channel | S WATCH - South Watch Tower |
| RADIO 1 - Radio Channel 1 | RADIO 2 - Radio Channel 2 |
| N WATCH - North Watch Tower | EMRGNCY - Emergency All Call |
| COMMAND - Port Security Command | WEATHER - Weather Service Chn. |
| FIRE - Local Fire Department Liaison | POLICE - Local Police Liaison |
| P. RELATIONS - Public Relations Officer | RADAR - Radar Operator |

Water Distribution

A regional water distribution system is operated and monitored from a control room located within one plant. This plant is connected with other plants in a regional water sharing plan. The combined operation as well as each individual plant must be constantly monitored to insure a reliable and safe domestic water supply. The plants must be able to communicate at several levels in a seamless manner. Each plant has several operators who must be in constant touch with local personnel as well as with each other. In addition to normal operations, security has become a major issue and with it, greater needs in terms of instant and reliable local and wide area communications. A single system capable of interfacing to all internal and external systems (i.e. security department radios and local police) can simplify and integrate communications for fewer errors, higher efficiency, and increased public safety. As needs change the system can be re-programmed and expanded with virtually no down time, further enhancing overall cost savings.

| Key: Water Distribution Virtual Control Panel | |
| --- | --- |
| PLANT 1 - Storage/Reservoir Plant 1 | PLANT 2 - Storage/Reservoir Plant 2 |
| PLANT 3 - Storage/Reservoir Plant 3 | MAINT - Maintenance Department |
| SECURITY - Security Department | EXT PAGE - Outdoor Area Page |
| PLANT 4 - Storage/Reservoir Plant 4 | PLANT 5 - Generator Plant 5 |
| PLANT 6 - Generator Plant 6 | FLD TEAM - Local Plant Mobile Personnel |
| TEST LAB - Water Quality Testing Lab | POLICE - Local Police Department Liaison |

Energy Distribution

A regional electrical power distribution grid is operated and monitored from a control room located within one plant. This plant is connected with other plants in a regional power sharing grid. The combined operation as well as each individual plant must be constantly monitored to insure reliable and consistent operation. The plants must be able to communicate at several levels in a seamless manner. Each plant has several operators who must be in constant touch with local personnel as well as with each other. Security, interoperability with other communication systems, and system flexibility are critical.

| Key: Power Generation Virtual Control Panel | |
| --- | --- |
| PLANT 1 - Generator Plant 1 | PLANT 2 - Generator Plant 2 |
| CNTL RM - Central Control Room | SECURITY - Security Department |
| FLD CREW - Field Crew Radio Channel | PAGING - Outdoor Area Page |
| PLANT 3 - Generator Plant 3 | PLANT 4 - Generator Plant 4 |
| MAINT - Maintenance Department | ENG OFFC - Engineering Office |
| GEN ROOM - Local Generator Room | PLANT MGR - Plant Manager Office |

Live Events

World Class Events such as Olympics Summer Games are years in the making requiring hundreds of creative and planning meetings leading up to rehearsals a few weeks prior. Assembling all team members at the venue prior to the Games is not practical, especially as many involved work multiple shows. Unlike a traditional telephone conference, systems and methods of the present invention afford team leaders instantaneous access to team members with no dialing or number searching and the power to manage simultaneous communications with multiple separate work groups while maintaining privacy between individual groups. In addition, individual groups may be joined together further enhancing flexibility.

| Pre Production Team Members | |
| --- | --- |
| Executive Producer - Beijing | Translator - Beijing |
| Creative Producer - United States | Creative Producer - France |
| Creative Producer - Italy/Australia | Production Designer -England |
| Musical Director - anywhere in the world | Choreographer - anywhere in the world |
| Segment Creator 1 - anywhere in the world | Segment Creator 2 - anywhere in the world |
| Graphic Artist - anywhere in the world | Associate Producer - anywhere in the world |
| Technical Director - anywhere in the world | Mechanical Engineering - multiple locations |

The following section describes exemplary, non-limiting implementation of the present invention for the replacement of two-way radios. Over the last 50 years, two-way radios, also called push-to-talk radios, have become a staple of many industries and public service agencies with millions of two-way radios in use around the world. Europe's $10^{th}$ largest airport, Schiphol in Holland, for example, uses 14,000 walkie-talkies. Public agencies, retail industries, emergency operations, utilities, health care, transportation, and businesses around the world depend on these legacy devices to keep their field and mobile workforces in touch. Job-site applications include restaurants, retail, security, property management, schools, construction, and recreation. Regardless of the application, two-way radios are islands unto themselves, the last major communications technology outside of the IP fold, and at a time when virtually every business and organization in the developed world uses IP networks.

In some embodiments, the present invention utilizes control console software loaded onto a standard Internet-enabled handheld device. Such a system has the richness of professional intercommunications functionality previously discussed, including full duplex functionality. Flexibility and interoperability go from virtually non-existent to the cutting edge of today's IP-based communications systems and scalability is significantly improved. In some embodiments, the network orientation offers all the necessary support, such as monitoring channels, maintaining security, controlling the flow of communications among the different resources, and uniting disparate proprietary communications systems.

We claim:

1. A client/server software based system comprising a plurality of processors and software components, said server software configured to:
   a) utilize Voice over Internet Protocol (VoIP) techniques for audio distribution;
   b) receive audio information from a plurality of audio sources using said VoIP techniques;
   c) send audio information to a plurality of communication devices using said VoIP techniques;
   d) provide control information to a control panel interface that permits a client using said control panel interface to manage said audio information;
   e) provide control information to a system administration interface that permits a client using said system administration interface to configure the system; and
   f) provide control information to a device interface that permits a client using said device interface to interface the system to external audio systems;

wherein said system is a non-blocking system that provides full audio summing allowing:
   i) all clients to communicate with any or all other clients in any combination without restriction; and
   ii) audio initiated and directed from one client to another to be delivered and heard by the other client without any action required on the part of the receiving client.

2. The system of claim 1, wherein said clients and server deploy on standard, off-the-shelf, personal computer based hardware using existing network infrastructure within either a private local area network or over the public Internet with no geographic constraints.

3. The system of claim 1, wherein the VoIP techniques utilized allow:
   a) specification of system and client audio bandwidth to allow user control of audio quality and network bandwidth requirements; and
   b) specification of the audio time slice per packet to reduce network bandwidth in favor of increased latency which permits operation over limited bandwidth channels.

4. The system of claim 1, wherein said control panel provides one or more or all of:
   a) a plurality of clickable keys to provide on/off control of communication channels with configurable controls for activating talk only, listen only or talk and listen;
   b) activation of point-to-point private channel communication between operators;
   c) activation of a group call between one or more operators acting as callers and a larger number of listeners;
   d) activation of a party line for a group conference between a plurality of callers and listeners;
   e) an indication of the log on status of a plurality of operators or listeners;
   f) an indication of the active communication status of a channel; and
   g) a plurality of different clickable key arrangement options provided to each different operator.

5. The system of claim 1, wherein said system administration interface provides one or both of:
   a) the ability to remotely configure all parameters of said system; and
   b) the ability to remotely monitor the status all client connections.

6. The system of claim 5, wherein said ability to remotely monitor the status of all client connections includes the ability to monitor audio data rates and packet loss statistics.

7. The system of claim 1, wherein said device interface provides one or more or all of:
   a) ability to connect a plurality of external audio devices to the system with no user action required;
   b) ability to interface standard analog telephone lines through the use of an off-the-shelf telephone interface device; and
   c) ability to sense external logic inputs and activate external logic outputs using input/output hardware.

8. The system of claim 1, wherein the system supports one or more features that are available in professional hardware based intercom solutions, comprising:
   a) Channel Isolation (ISO), the ability to create a private two-way point-to-point conversation between clients;
   b) Channel Interrupt Fold Back, (IFB), the ability to temporarily interrupt or dim an audio source monitored by a client when another client activates a talk that to that client; and
   c) client adjustable audio level control for each selectable communication channel with differentiated handling of audio levels for individual clients and groups.

9. The system of claim 1, using said VoIP techniques, wherein when used with mobile PDAs, SmartPhones, and other off-the-shelf handheld devices connected over WiFi and Cellular data connections, provides enhanced replacement functionality for traditional Two-Way Radios.

10. The system of claim 1, using said VoIP techniques, wherein when deployed on mini-PCs with a sound card connected to standard analog 4-wire phone, provides enhanced replacement functionality of the traditional hard-wired analog 4-wire conference bridge.

11. The system of claim 1, wherein said audio sources include one or more of audio from a wired audio device, audio from a wireless audio device, audio from a telephone, and audio from a two-way radio.

12. The system of claim 1, wherein said control information is provided on a plurality of workstations.

13. The system of claim 12, wherein each of said workstations are configured to dynamically configure said control information.

14. A method of communicating, comprising sending and receiving audio information using a processor and software of a client/server software based system; said system comprising:
   a plurality of processors and software components, said server software configured to:
   a) utilize Voice over Internet Protocol (VoIP) techniques for audio distribution;
   b) receive audio information from a plurality of audio sources using said VoIP techniques;
   c) send audio information to a plurality of communication devices using said VoIP techniques;
   d) provide control information to a control panel interface that permits a client using said control panel interface to manage said audio information;
   e) provide control information to a system administration interface that permits a client using said system administration interface to configure the system; and
   f) provide control information to a device interface that permits a client using said device interface to interface the system to external audio systems;

wherein said system is a non-blocking system that provides full audio summing allowing:
   i) all clients to communicate with any or all other clients in any combination without restriction; and ii) audio initiated and directed from one client to another to be delivered and heard by the other client without any action required on the part of the receiving client.

* * * * *

UNITED STATES PATENT AND TRADEMARK OFFICE
CERTIFICATE OF CORRECTION

PATENT NO. : 8,942,141 B2  
APPLICATION NO. : 14/154977  
DATED : January 27, 2015  
INVENTOR(S) : Stephen Brand, John Jurrius and David Brand Page 1 of 1

It is certified that error appears in the above-identified patent and that said Letters Patent is hereby corrected as shown below:

On the Title page, at (73), please correct Assignee state to CA.

Signed and Sealed this
Twelfth Day of May, 2015

Michelle K. Lee
*Director of the United States Patent and Trademark Office*